United States Patent
Holness et al.

(10) Patent No.: US 9,781,048 B2
(45) Date of Patent: Oct. 3, 2017

(54) DYNAMIC PACKET TRAFFIC PERFORMANCE ADJUSTMENT SYSTEMS AND METHODS

(71) Applicants: Marc Holness, Nepean (CA); David Wright Martin, Stittsville (CA)

(72) Inventors: Marc Holness, Nepean (CA); David Wright Martin, Stittsville (CA)

(73) Assignee: Ciena Corporation, Hanover, MD (US)

( * ) Notice: Subject to any disclaimer, the term of this patent is extended or adjusted under 35 U.S.C. 154(b) by 180 days.

(21) Appl. No.: 14/622,989

(22) Filed: Feb. 16, 2015

(65) Prior Publication Data

US 2016/0036714 A1   Feb. 4, 2016

Related U.S. Application Data

(63) Continuation of application No. 13/724,204, filed on Dec. 21, 2012, now Pat. No. 8,958,332.

(51) Int. Cl.
| | |
|---|---|
| *H04L 12/805* | (2013.01) |
| *H04L 12/813* | (2013.01) |
| *H04L 5/00* | (2006.01) |
| *H04L 12/707* | (2013.01) |

(52) U.S. Cl.
CPC .......... *H04L 47/365* (2013.01); *H04L 5/0064* (2013.01); *H04L 45/24* (2013.01); *H04L 47/20* (2013.01)

(58) Field of Classification Search
CPC ........... H04L 12/2439; H04L 12/40065; H04L 27/3405; H04L 47/783; H04W 28/16
See application file for complete search history.

(56) References Cited

U.S. PATENT DOCUMENTS

| | | |
|---|---|---|
| 7,499,407 B2 | 3/2009 | Holness et al. |
| 7,505,466 B2 | 3/2009 | Rabie et al. |
| 7,590,054 B1 | 9/2009 | Holness et al. |
| 7,633,968 B2 | 12/2009 | Haran et al. |
| 8,144,586 B2 | 3/2012 | McNaughton et al. |

(Continued)

OTHER PUBLICATIONS

Publication: MEF Technical Specification MEF 10.2; Ethernet Services Attributes Phase 2 (MEF 10.2 (C) The Metro Ethernet Forum) Oct. 27, 2009.

*Primary Examiner* — Benjamin H Elliott, IV
(74) *Attorney, Agent, or Firm* — Clements Bernard Walker PLLC; Christopher L. Bernard; Lawrence A. Baratta, Jr.

(57) ABSTRACT

A method, a network, and a network element use dynamic packet traffic performance adjustment techniques. In an exemplary embodiment, the dynamic resizing techniques utilize different packet connections providing connectivity to same sites between which bandwidth resizing is needed. Each of the packet connections has a separate and independent bandwidth profile that governs an amount of traffic that is dispatched over each packet connection. A network element sourcing traffic into the packet connections uses bridge functionality that dispatches client traffic onto all of the packet connections or an individual packet connection. This effectively means that the transport network bandwidth utilization is only consumed by a single packet connection, i.e., the packet connection-A (even through there are multiple configured). The network element sinking the traffic selects from a single active packet connection.

19 Claims, 10 Drawing Sheets

(56) References Cited

U.S. PATENT DOCUMENTS

| | | | |
|---|---|---|---|
| 8,958,332 B2* | 2/2015 | Holness | H04L 47/20 370/252 |
| 2005/0160180 A1* | 7/2005 | Rabje | H04L 47/10 709/238 |
| 2007/0268817 A1 | 11/2007 | Smallegange et al. | |
| 2007/0280117 A1 | 12/2007 | Katz et al. | |
| 2008/0192773 A1* | 8/2008 | Ou | H04L 12/2801 370/468 |
| 2009/0175176 A1 | 7/2009 | Mohan | |
| 2010/0135291 A1 | 6/2010 | Martin et al. | |
| 2010/0177635 A1 | 7/2010 | Figueira | |
| 2010/0220724 A1 | 9/2010 | Rabie et al. | |
| 2010/0250733 A1 | 9/2010 | Turanyi et al. | |
| 2010/0260197 A1 | 10/2010 | Martin et al. | |
| 2012/0051362 A1* | 3/2012 | Rabie | H04L 47/10 370/392 |
| 2012/0230214 A1 | 9/2012 | Kozisek et al. | |
| 2012/0243405 A1 | 9/2012 | Holness et al. | |
| 2012/0250695 A1 | 10/2012 | Jia et al. | |
| 2014/0177439 A1 | 6/2014 | Holness et al. | |
| 2016/0036714 A1* | 2/2016 | Holness | H04L 47/20 370/230 |

\* cited by examiner

DYNAMIC PACKET TRAFFIC PERFORMANCE ADJUSTMENT SYSTEMS AND METHODS

FIELD OF THE INVENTION

Generally, the field of art of the present disclosure pertains to networking systems and methods, and more particularly, to dynamic packet traffic performance adjustment systems and methods.

BACKGROUND OF THE INVENTION

Emerging network applications (e.g., Cloud services) require the need to dynamically adjust packet traffic performance (e.g., "resize" bandwidth) connections between network element end-points without impacting (or minimizing) the client traffic being transported over the connection. Given state of the art network element capabilities and internal components (e.g., hardware components such as Application Specific Integrated Circuits (ASICs)), there are currently two primary techniques to attempt to address the dynamic adjustment of packet traffic performance problem. First, network elements (NEs) can provide a capability allowing a user to change a bandwidth profile in-service. Current realizable implementations require the existing bandwidth profile (e.g., BW-Profile1), associated with a packet connection to be "re-sized", to be removed/deleted (thus impacting in-service traffic), and then a new First profile (e.g., BW-Profile2) to be added. This can be done, but the time taken to change the bandwidth profile affects traffic, given current implementation considerations. Second, NEs can include internal components that can support a sophisticated dynamic real-time bandwidth profile adjustment, while minimizing or nullifying the amount of in-service client traffic loss. In general, a typical switching device (especially those supported via current ASICs) is challenged to support such a sophisticated dynamic real-time bandwidth profile adjustment mechanism.

Thus, conventional techniques either result in a larger service traffic disruption, for NEs that require a bandwidth profile to be removed from a packet connection and then create a new BW profile and re-add it to the packet connection or require sophisticated dynamic bandwidth profile adjustment mechanisms, which are not typically supported in generally available ASICs. Consequently, a mechanism to adjust a packet connection bandwidth profile is required, without impacting or at least minimizing the in-service traffic impact (i.e., client traffic loss) is needed.

BRIEF SUMMARY OF THE INVENTION

In an exemplary embodiment, a method includes operating a first packet connection having a first bandwidth profile and a second packet connection having a second bandwidth profile, wherein the second bandwidth profile is set to zero; bridging ingress traffic at a source network element onto both the first packet connection and the second packet connection; selecting egress traffic at a sink network element from the first packet connection; responsive to a requirement for a bandwidth change in the first packet connection, modifying the second bandwidth profile accordingly at the first network element; selecting egress traffic at the sink network element from the second packet connection; and changing the first bandwidth profile to zero. The first packet connection and the second packet connection each can include a packet connection with the first bandwidth profile and the second bandwidth profile being separate and different. The first bandwidth profile can include a first Committed Information Rate and a first Excess Information Rate; and the second bandwidth profile can include a second Committed Information Rate and a second Excess Information Rate.

Prior to the requirement for the bandwidth change, the second Committed Information Rate and a second Excess Information Rate can be zero; and, subsequent to the modifying the second bandwidth profile, the second Committed Information Rate and a second Excess Information Rate can be set at values based on the requirement for the bandwidth change. The method can further include switching a selector at the sink network element at a time, t, subsequent to modifying the second bandwidth profile; wherein impact to client traffic from the source network element is limited to the time t.

The method can further include switching operating N packet connections each having an associated bandwidth profile, wherein the first packet connection includes one of the N packet connections; responsive to a requirement for a traffic performance change in the active packet connection, modifying the second bandwidth profile accordingly at the first network element; selecting egress traffic at the sink network element to the second packet connection for the any of the N packet connections; and changing a bandwidth profile to zero of the first packet connection.

The method can further include operating a first packet connection having a first bandwidth profile and a second packet connection having a second bandwidth profile; bridging ingress traffic at a source network element onto the first packet connection only; merging egress traffic at a sink network element from both the first and second packet connection; responsive to a requirement for a bandwidth change in the first packet connection, switching the bridge at the source network element to the second connection. The first packet connection and the second packet connection each can include a packet connection with the first bandwidth profile and the second bandwidth profile being separate and different. The first bandwidth profile can include a first Committed Information Rate and a first Excess Information Rate; and the second bandwidth profile can include a second Committed Information Rate and a second Excess Information Rate.

In another exemplary embodiment, a network includes a first packet network element; a second packet network element communicatively coupled to the first packet network element; a first packet connection between the first packet network element and the second packet network element having a first bandwidth profile being a first value; a second packet connection between the first packet network element and the second packet network element having a second bandwidth profile being set to zero; a bridge at the first packet network element configured to bridge ingress traffic onto both the first packet connection and the second packet connection; and a selector at the second packet network element configured to select traffic from one of the first packet connection and the second packet connection; wherein, responsive to a requirement to resize bandwidth of the first packet connection, the second bandwidth profile is set accordingly, the selector switches to the second packet connection, and the first bandwidth profile is set to zero.

The first packet connection and the second packet connection each can include a packet connection with the first bandwidth profile and the second bandwidth profile being separate and different. The first bandwidth profile can include a first Committed Information Rate and a first Excess Information Rate; and wherein the second bandwidth profile can include a second Committed Information Rate and a second Excess Information Rate. Prior to the requirement to resize bandwidth, the second Committed Information Rate and a second Excess Information Rate can be zero; and, subsequent to the setting the second bandwidth profile, the second Committed Information Rate and a second Excess Information Rate can be set at values based on the requirement to resize bandwidth. Responsive to a requirement to resize bandwidth of the first packet connection, the selector can be configured to switch at a time, t, subsequent to the setting of the second bandwidth profile; wherein impact to client traffic from the source network element is limited to the time t.

In yet another exemplary embodiment, a network element includes at least one port; a packet switching fabric coupled to the at least one port; and a controller including instructions that, when executed, cause the controller, the at least one port, and the packet switching fabric to: operate a first packet connection having a first bandwidth profile and a second packet connection having a second bandwidth profile, wherein the second bandwidth profile is set to zero; bridge ingress traffic at the at least one port onto both the first packet connection and the second packet connection; responsive to a requirement for a bandwidth change in the first packet connection, modify the second bandwidth profile accordingly; and change the first bandwidth profile to zero subsequent to modifying the second bandwidth profile. The first packet connection and the second packet connection each can include a packet connection with the first bandwidth profile and the second bandwidth profile being separate and different. The first bandwidth profile can include a first Committed Information Rate and a first Excess Information Rate; wherein the second bandwidth profile includes a second Committed Information Rate and a second Excess Information Rate; wherein prior to the requirement for the bandwidth change, the second Committed Information Rate and a second Excess Information Rate are zero; and, subsequent to the modifying the second bandwidth profile, the second Committed Information Rate and a second Excess Information Rate are set at values based on the requirement for the bandwidth change.

The network element can include a source network element; wherein a second network element can include a sink network element for the first packet connection and the second packet connection; wherein the sink network element is configured to switch a selector from the first network element to the second network element at a time, t, subsequent to the modifying the second bandwidth profile; and wherein impact to client traffic from the source network element is limited to the time t. The instructions that, when executed, can further cause the controller, the at least one port, and the packet switching fabric to: operate N packet connections each having an associated bandwidth profile, wherein the first packet connection includes one of the N packet connections; responsive to a requirement for a bandwidth change in any of the N packet connections, modify the second bandwidth profile accordingly; and change a bandwidth profile to zero for the first packet connection.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, dynamic packet traffic performance adjustment systems and methods are described using dynamic resizing techniques. In an exemplary embodiment, the dynamic resizing techniques utilize different packet connections providing connectivity to same sites between which bandwidth resizing is needed. Each of the packet connections has a separate and independent bandwidth profile that governs an amount of traffic that is dispatched over each packet connection. A network element (NE) sourcing traffic into the packet connections uses bridge functionality that dispatches client traffic onto all of the packet connections. Only one of the packet connections will have a non-zero bandwidth profile (which governs the amount of traffic that is dispatched to the packet connection), i.e., a packet connection-A. This effectively means that the transport network bandwidth utilization is only consumed by a single packet connection, i.e., the packet connection-A (even through there are multiple configured). The network element sinking the traffic selects from the single packet connection. Management co-ordination is required so that the sink network element selects from the packet connection-A actively sending traffic.

When "re-sizing" of the bandwidth connection is required, the bandwidth profile of the "active" packet connection-A is moved from non-zero-A to zero (non-zero-A being the bandwidth amount of the packet connection-A), an alternate bandwidth profile packet connection-B is moved from zero to non-zero-B, and the "selector" function at the sink NE is moved from packet connection-A to packet connection-B. This changes the bandwidth profile from non-zero-A to non-zero-B in a minimally service-affecting manner. The actual disruption in client traffic being transported between sites is governed by the time it takes to change the selector function at the sink network element, which is minimal, and can be easily realizable, by the most basic of packet switching network elements.

Beneficially, the dynamic resizing techniques support dynamic resizing of (a connection) bandwidth, while retaining the minimization of client service traffic loss/disruption, which can be readily realized by packet switching network elements. It is expected such functionality will be especially advantageous with respect to cloud services, data center interconnectivity, etc. which require rapid, dynamic resizing of bandwidth connections providing site connectivity, while minimizing the amount of disruption to the client traffic being transported. Packet technologies, Multiprotocol Label Switching (MPLS)-based, MPLS-Transport Profile (MPLS-TP)-based, Virtual Private Local Area Network Service (VPLS)-based, Internet Protocol (IP)-based, etc. are contemplated herewith.

Figure 1:
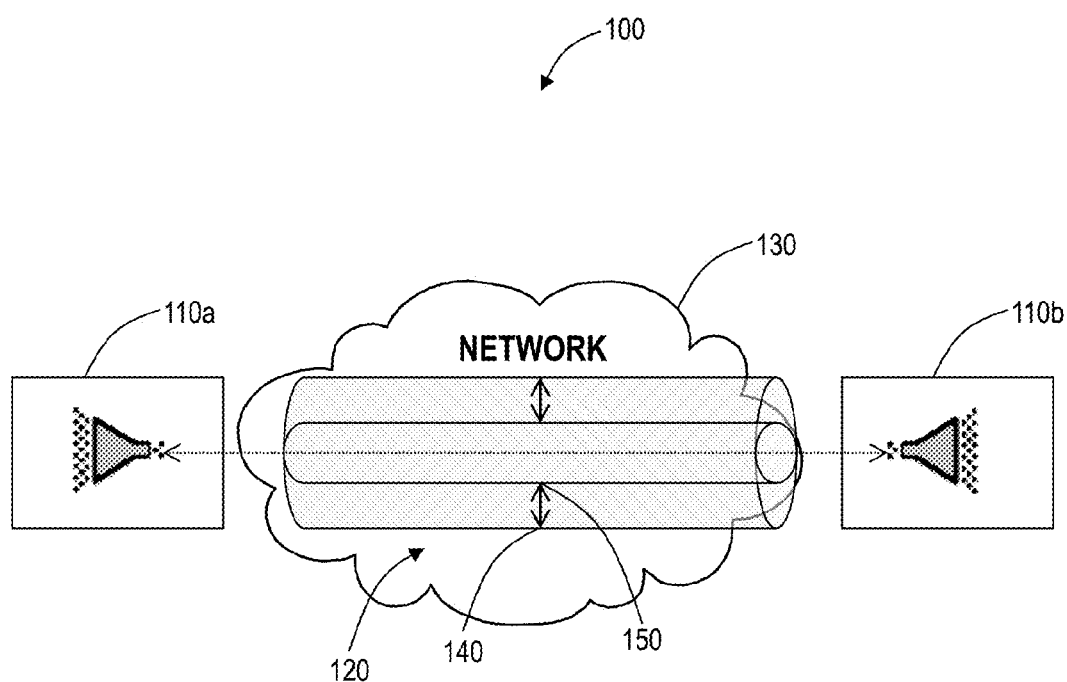
FIG. 1 is a network diagram of a network showing two interconnected packet switching network elements.

Referring to FIG. 1, in an exemplary embodiment, a network diagram illustrates a network 100 showing two interconnected packet switching network elements 110a, 110b. The network elements 110a, 110b have a packet connection 120 there between over a network infrastructure 130 which can include optical equipment or the like forming physical links between the network elements 110a, 110b. The packet switching network elements 110a, 110b can include any type of network element such as, without limitation, a packet switch, an optical switch with packet switching capabilities, a service delivery switch, a service aggregation switch, a service module disposed within a larger system such as a wavelength division multiplexing (WDM) node or a microwave node, and the like.

The connection 120 can include a packet connection. For example, packet connections can be Ethernet Virtual Connections (EVCs) which are a service container described in the Metro Ethernet Forum's (MEF) technical specification 10.2, "Ethernet Services Attributes Phase 2," October 2009, the contents of which are incorporated by reference herein. Of course, the connection 120 can be other types of packet connections. In this exemplary embodiment of FIG. 1, the connection 120 can be at a first bandwidth 140 and it may be desired to resize to a second bandwidth 150. Note, the bandwidths 140, 150 can also be reversed, i.e., the dynamic resizing techniques described herein can support increases or decreases in bandwidth. Also, in an exemplary embodiment, the network elements 110a, 110b could be between data centers or the like in an application requiring the connection 120 to vary in size. Further, for this exemplary embodiment, the network element 110a is assumed to be a source for packet traffic and the network element 110b is assumed to be a sink for purposes of the following descriptions.

Figure 2:
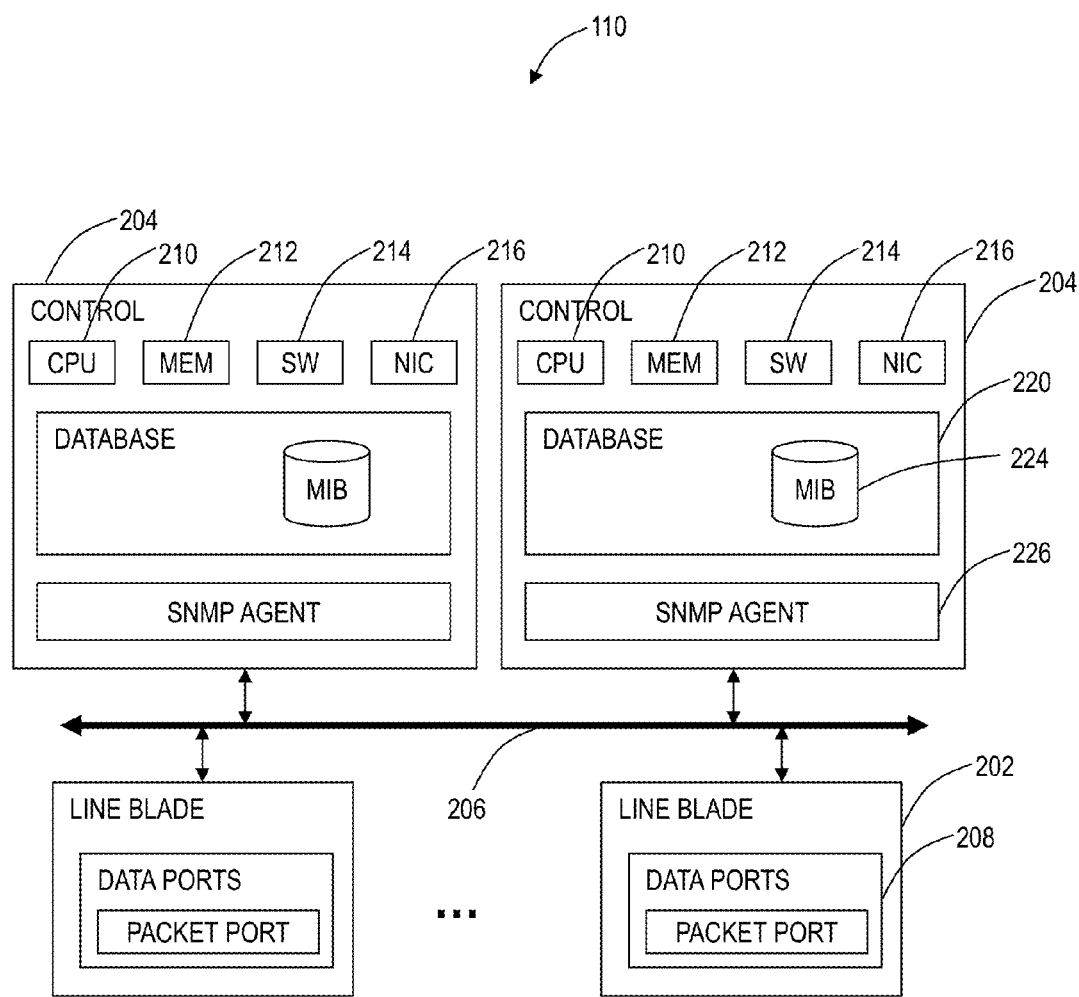
FIG. 2 is a block diagram of an exemplary implementation of a network element such as the packet switching network elements in the network of FIG. 1.

Referring to FIG. 2, in an exemplary embodiment, a block diagram illustrates an exemplary implementation of a network element 110 such as the packet switching network elements 110a, 110b in the network 100. In this exemplary embodiment, the network element 110 is a packet network switch for illustration purposes, but those of ordinary skill in the art will recognize the systems and methods described herein contemplate other types of network elements and other implementations providing dynamic traffic performance of packet connections. In this exemplary embodiment, the network element 110 includes a plurality of blades 202, 204 interconnected via an interface 206. The blades 202, 204 are also known as line cards, line modules, circuit packs, pluggable modules, etc. and refer generally to components mounted within a chassis, shelf, etc. of a data switching device, i.e. the network element 110. Each of the blades 202, 204 may include numerous electronic devices and/or optical devices mounted on a circuit board along with various interconnects including interfaces to the chassis, shelf, etc.

Two exemplary blades are illustrated with line blades 202 and control blades 204. Of course, other types of blades are also contemplated. The line blades 202 generally include data ports 208 such as a plurality of packet ports. For example, the line blade 202 may include a plurality of physical ports disposed on an exterior of the blade 202 for receiving ingress/egress connections. Exemplary port types may include, without limitation, gigabit packet (GbE), 10 GbE, 40 GbE, 100 GbE, Ethernet over SONET/SDH, Ethernet over Optical Transport Network, and the like. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the network element 110 out by the correct port 208 to the next network element. In general, the switching fabric may include switching units, or individual boxes, in a node; integrated circuits contained in the switching units; and programming that allows switching paths to be controlled. Note, the network element 110 is illustrated herein in a multi-blade configuration. Also, the network element 110 could be a single blade with line ports and the switching fabric contained therein. The single blade could also be part of another type of network element such as an optical switch, a WDM device, or the like.

The control blades 204 include a microprocessor 210, memory 212, software 214, and a network interface 216. Specifically, the microprocessor 210, the memory 212, and the software 214 may collectively control, configure, provision, monitor, etc. the network element 110. The network interface 216 may be utilized to communicate with a management system such as a Network Management System (NMS), Element Management System (EMS), and the like. Additionally, the control blades 204 may include a database 220 that tracks and maintains provisioning, configuration, operational data and the like. The database 220 may include a management information base (MIB) 222 which may include service related objects. Further, the control blades 204 may include a Simple Network Management Protocol (SNMP) Agent 224 configured to operate SNMPv2, SNMPv3, etc. or some other network management communication protocol. In this exemplary embodiment, the network element 110 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 110.

Figure 3:
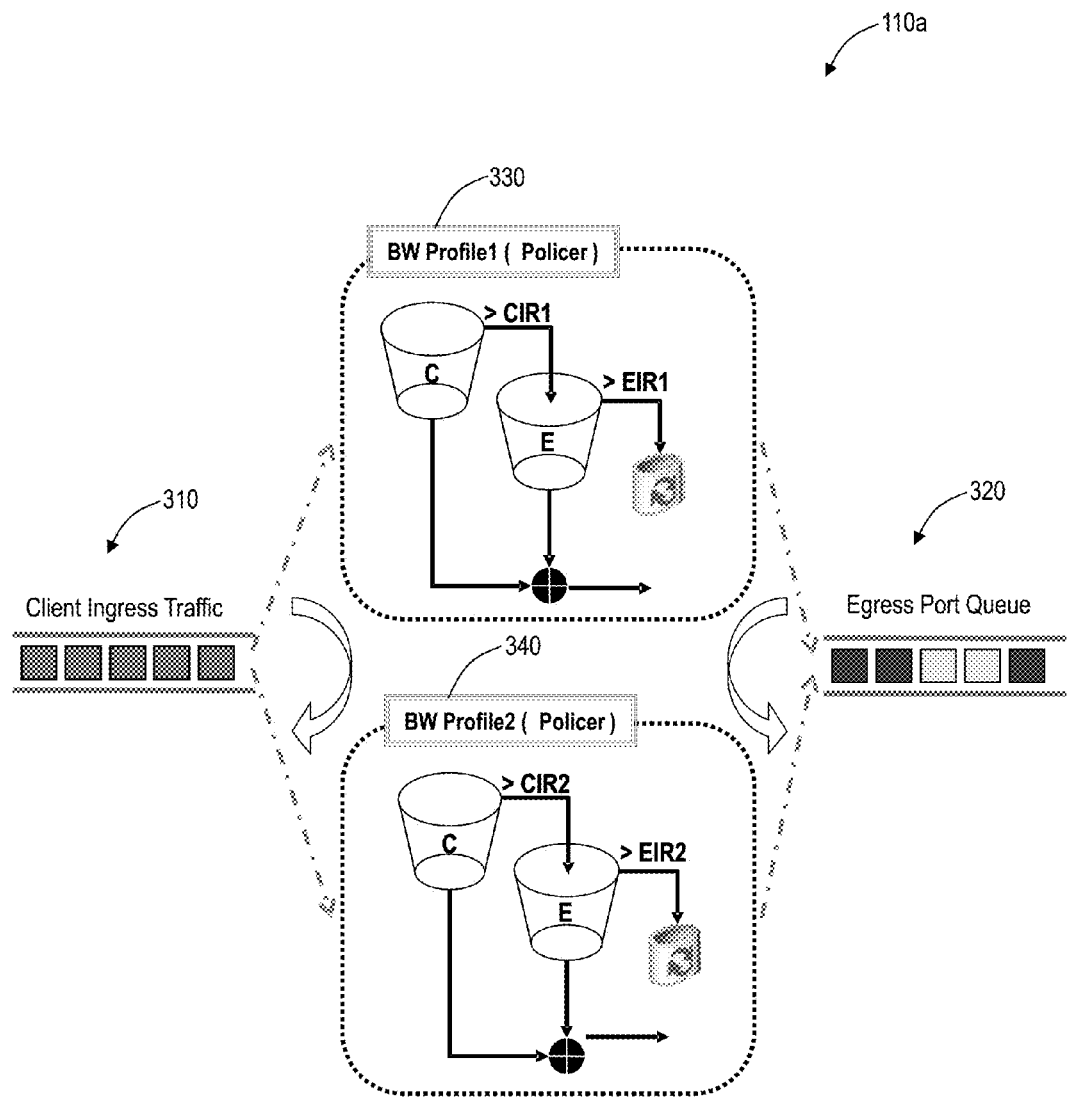
FIG. 3 is a block diagram of a first conventional technique for resizing bandwidth at a network element.
Figure 4:
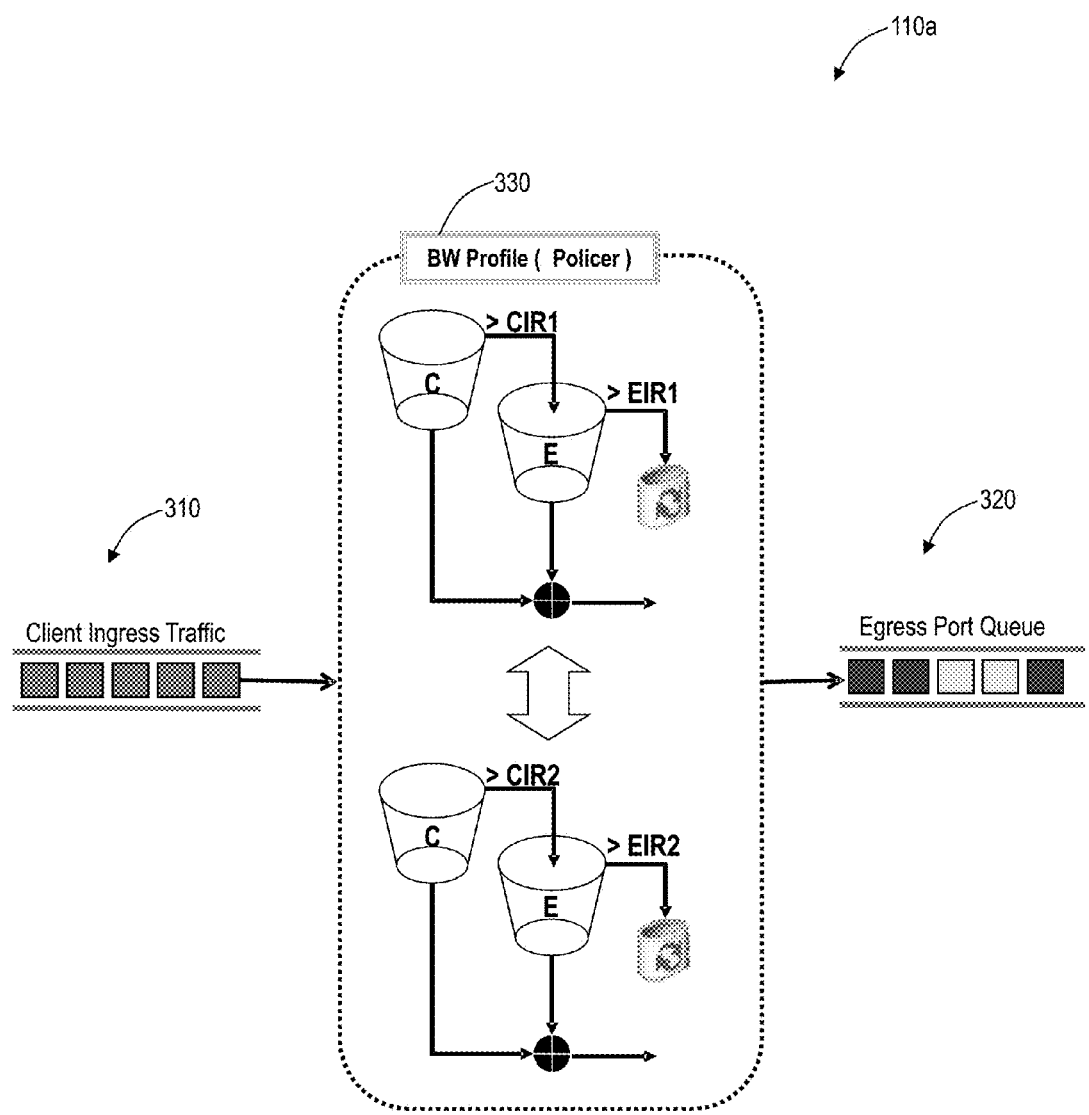
FIG. 4 is a block diagram of a second conventional technique for resizing bandwidth at a network element.

Referring to FIGS. 3-4, in conventional embodiments, the block diagrams illustrate a first conventional technique (FIG. 3) and a second conventional technique (FIG. 4) for resizing bandwidth at the network element 110a. The network element 110a has client ingress traffic 310 which is provided to an egress port queue 320. Note, other components are omitted for simplicity. Within the switching fabric of the network element 110a, there is a first bandwidth profile (BW profile 1) 330 for the connection 120. The profile 330 includes a first committed information rate (CIR1) and a first excess information rate (EIR1) which provide the client ingress traffic 310 to the egress port queue 320 thereon.

In FIG. 3, it is desired to change the profile 330 to a different, second bandwidth profile (BW profile 2) 340. The profile 340 includes a second committed information rate (CIR2) and a second excess information rate (EIR2) which provide the client ingress traffic 310 to the egress port queue 320 thereon. In this conventional embodiment, switching between the profiles 330, 340 is possible, but the time required to change between the profiles 330, 340 affects traffic. Specifically, in current realizable implementations, the profile 330 has to be removed (thus impacting in-service traffic) and then the profile 340 has to be added. Thus, conventional network element implementations require that client traffic is disrupted (i.e., lost) during the change from one bandwidth profile to the other associated with the packet connection being "re-sized".

In FIG. 4, it is desired to change the profile 330 by changing the CIR1 and EIR1 rates to new, different CIR2 and EIR2 rates. In this exemplary embodiment, the network element 110a includes a sophisticated and dynamic real-time bandwidth adjustment mechanism that enables changing the profile 330 while minimizing an amount of in-service traffic loss. However, the network element 110a must include hardware, software, and/or firmware to implement this sophisticated and dynamic real-time bandwidth adjustment mechanism.

Figure 5:
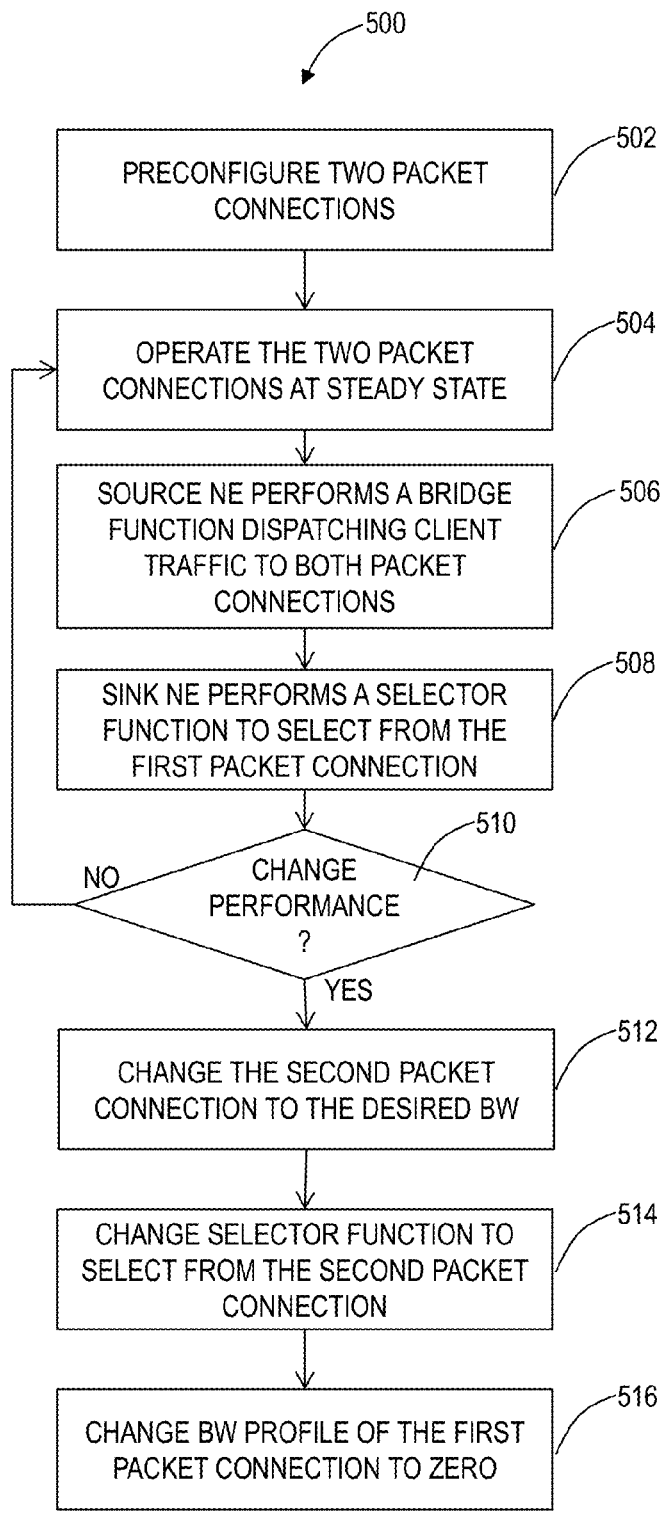
FIG. 5 is a flowchart of a dynamic packet traffic performance adjustment method.

Referring to FIG. 5, in an exemplary embodiment, a flowchart illustrates a dynamic bandwidth resizing method 500. The dynamic bandwidth resizing method 500 contemplates operation in the network 100 between the network elements 110a, 110b as well as other networks and network elements. First, the dynamic bandwidth resizing method 500 includes preconfiguring two packet connections (step 502). The first packet connection can have a first bandwidth profile (BW_Profile_1) and the second packet connection can have a second bandwidth profile (BW_Profile_2). The dynamic bandwidth resizing method 500 includes operating the two packet connections at steady state (step 504). At this stage, the first bandwidth profile operates at <CIR, EIR> where CIR and EIR are values for the first bandwidth profile. The second bandwidth profile operates at <0, 0> where its CIR and EIR are each set to zero.

The dynamic bandwidth resizing method 500 includes a source network element performing a bridge function dispatching client traffic to both of the packet connections (step 506). Conversely, the dynamic bandwidth resizing method 500 includes a sink network element performing a selector function to select from the first packet connection (step 508). At this stage, the dynamic bandwidth resizing method 500 operates using the first packet connection at the first bandwidth profile. If there is a desired change in bandwidth (step 510), then the dynamic bandwidth resizing method 500 includes changing the second packet connection to the desired bandwidth (step 512). Specifically, the second bandwidth profile is changed to <CIR2, EIR2> where CIR2 and EIR2 are the new, different bandwidth amounts from the first bandwidth profile.

The dynamic bandwidth resizing method 500 includes changing the selector function at the second network element to select from the second packet connection (step 514). Finally, the dynamic bandwidth resizing method 500 includes setting the bandwidth profile of the first packet connection to <0, 0> for the CIR and EIR. Note, the dynamic bandwidth resizing method 500 includes a one for one correspondence between the two packet connections. Alternatively, there could be a 1:N relationship where the second packet connection is set to <0, 0> and waiting for any number, N, of working packet connections that want a corresponding bandwidth change. The trigger to switch to the second packet connection could be based on policy, on a schedule, on demand, etc.

Figure 6:
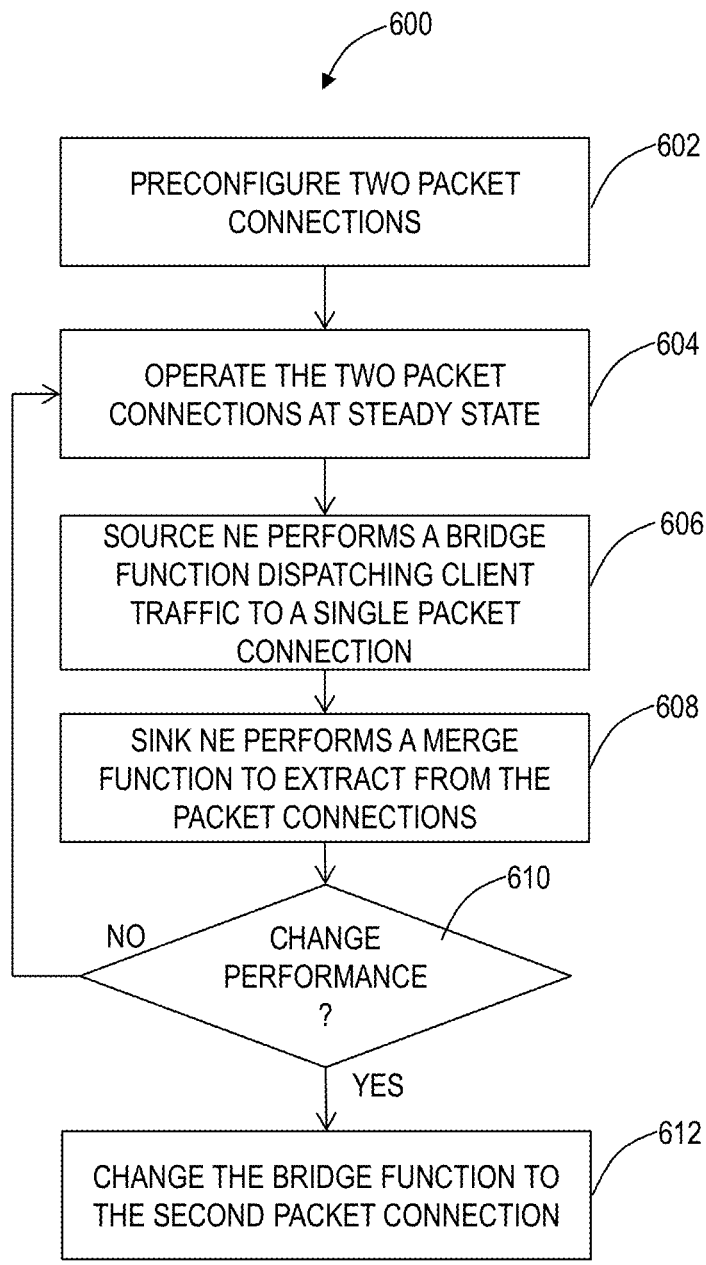
FIG. 6 is a flowchart of an alternate dynamic packet traffic performance adjustment method.

Referring to FIG. 6, in an exemplary embodiment, a flowchart illustrates a dynamic bandwidth resizing method 600. The dynamic bandwidth resizing method 600 contemplates operation in the network 100 between the network elements 110a, 110b as well as other networks and network elements. First, the dynamic bandwidth resizing method 600 includes preconfiguring two packet connections (step 602). The first packet connection can have a first bandwidth profile (BW_Profile_1) and the second packet connection can have a second bandwidth profile (BW_Profile_2). The dynamic bandwidth resizing method 600 includes operating the two packet connections at steady state (step 604).

At this stage, the first bandwidth profile operates at <CIR, EIR> where CIR and EIR are values for the first bandwidth profile. The second bandwidth profile operates at <CIR, EIR> where its CIR and EIR are values for the second bandwidth profile.

The dynamic bandwidth resizing method 600 includes a source network element performing a bridge function dispatching client traffic to a single of the packet connections (step 606). Conversely, the dynamic bandwidth resizing method 600 includes a sink network element performing a merge function to select from either of the packet connections (step 608). At this stage, the dynamic bandwidth resizing method 600 operates using the first packet connection at the first bandwidth profile. If there is a desired change in bandwidth (step 610), then the dynamic bandwidth resizing method 600 includes changing the bridge function to the second packet connection (step 612).

The dynamic bandwidth resizing method 600 includes changing the bridge function at the first network element to dispatch to the packet connection with the desired traffic performance (e.g., bandwidth resizing). Note, the dynamic bandwidth resizing method 600 includes a one for one correspondence between the two packet connections. Alternatively, there could be a 1:N relationship where the second packet connection is selected by the source network element. The trigger to switch to the second packet connection could be based on policy, on a schedule, on demand, etc.

Figure 7:
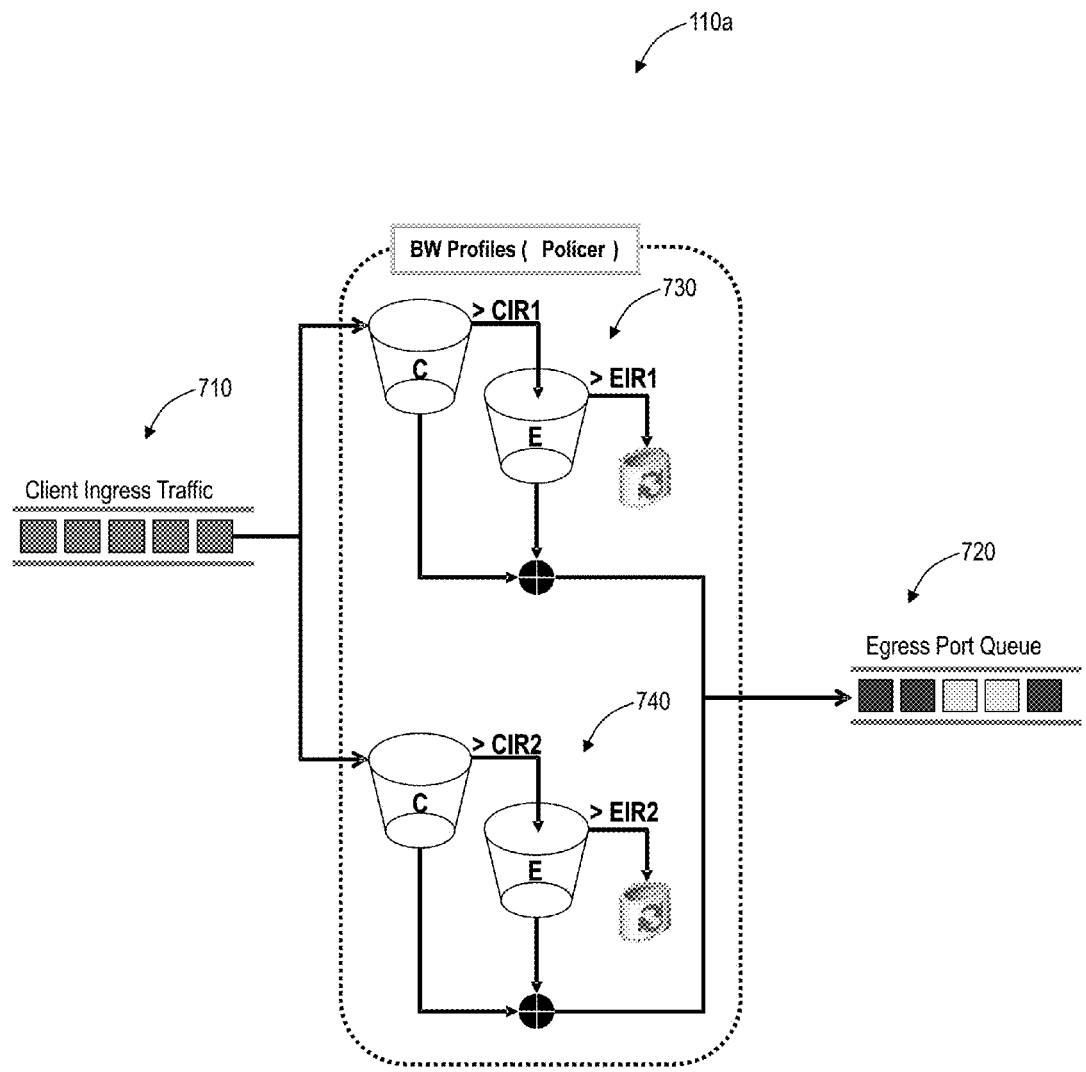
FIG. 7 is a block diagram of a network element implementing the packet traffic performance adjustment method of FIG. 5.

Referring to FIG. 7, in an exemplary embodiment, a block diagram illustrates the network element 110a implementing the dynamic bandwidth resizing method 500. Again, the network element 110a includes client ingress traffic 710 and an egress port queue 720. The network element 110a is operating two packet connections 730, 740 which forward traffic from the client ingress traffic 710 to the egress port queue 720. The packet connection 730 has a bandwidth profile <CIR1, EIR1 > and the packet connection 740 has a bandwidth profile <CIR2, EIR2 >. At first, <CIR1, EIR1 > equals some non-zero value for the packet connection 730 and <CIR2, EIR2 >=<0, 0> for the second packet connection 740. Upon a request to change the bandwidth profile of the first packet connection 730, the second packet connection 740 is set to the desired value. In this manner, none of the client ingress traffic 710 is lost or dropped. At the second network element 110b, the selector is switched after the bandwidth profile is set to the desired value for the packet connection 740.

Figure 8:
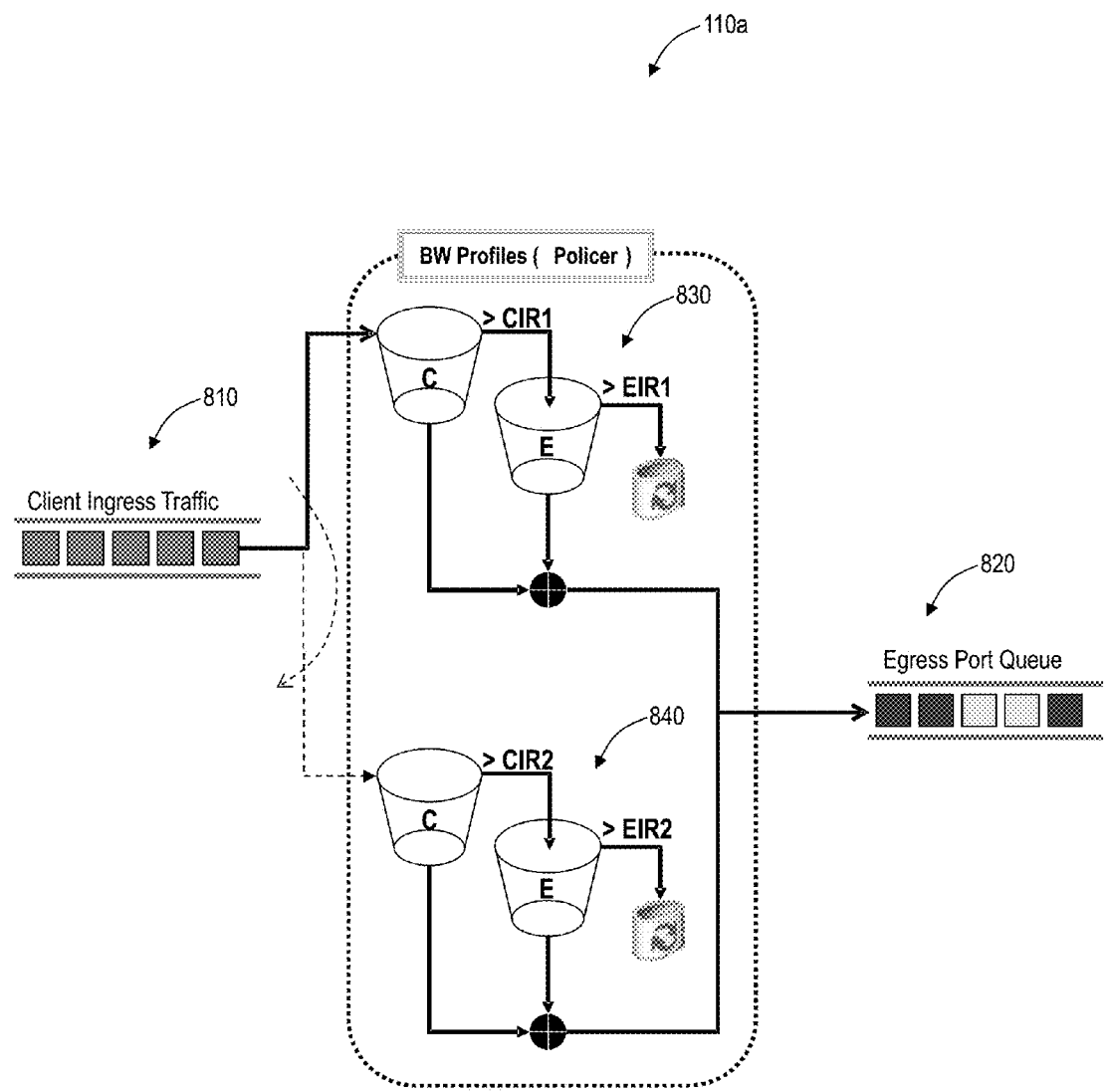
FIG. 8 is a block diagram of a network element implementing the packet traffic performance adjustment method of FIG. 6.

Referring to FIG. 8, in an exemplary embodiment, a block diagram illustrates the network element 110a implementing the dynamic bandwidth resizing method 600. Again, the network element 110a includes client ingress traffic 810 and an egress port queue 820. The network element 110a is operating two packet connections 830, 840 which forward traffic from the client ingress traffic 810 to the egress port queue 820. The packet connection 830 has a bandwidth profile <CIR1, EIR1 > and the packet connection 840 has a bandwidth profile <CIR2, EIR2 >. At first, network element 110*a* will bridge client traffic to the first packet connection 830. Upon a request to change the bandwidth profile of the packet connection 830, the client traffic gets re-directed (i.e., bridged) to the second connection 840. In this manner, none of the client ingress traffic 810 is lost or dropped. At the second network element 110*b*, the traffic is merged from both the first and second packet connections.

Figure 9:
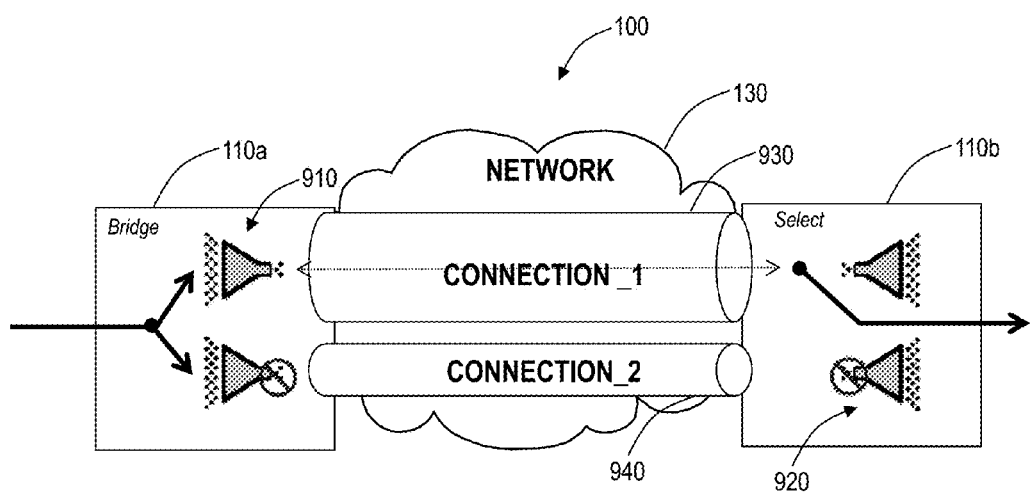
FIGS. 9 and 10 are network diagrams of the network of FIG. 1 implementing the dynamic packet traffic performance adjustment method of FIG. 5.
Figure 10:
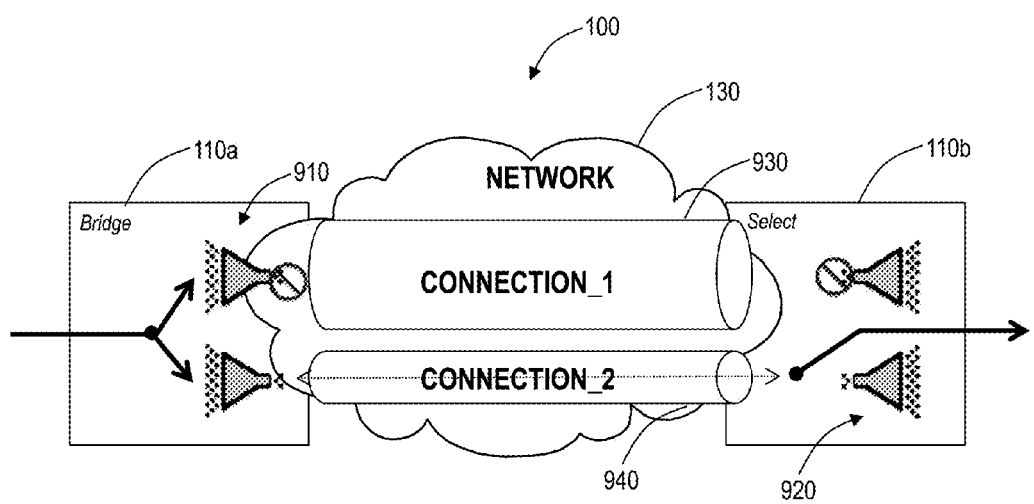

Referring to FIGS. 9 and 10, in an exemplary embodiment, network diagrams illustrate the network 100 implementing the dynamic bandwidth resizing method 500. In FIG. 9, the two packet connections 930, 940 are configured between the network elements 110*a*, 110*b*. At this stage, the packet connection 930 is operating at the first bandwidth profile with <CIR1, EIR1 > equaling some non-zero value for the packet connection 930. A bridging function 910 effectively sends all ingress client traffic to the packet connection 930 since the bandwidth profile of the packet connection 940 is <0, 0>. A selector function 920 at the network element 110*b* selects from the packet connection 930. Thus, at steady state, network bandwidth resource utilization is only consumed by the packet connection 930, since BW_Profile_2 is set to 0 (i.e., <CIR, EIR>=<0,0>).

Note, as described herein, the bandwidth profiles are described for illustration purposes as <CIR, EIR>. However, a bandwidth profile, for a packet connection, can include <CIR, CBS, EIR, EBS, CF, CM> where CIR is Committed Information Rate, CBS is Committed Burst Size, EIR is Excess Information Rate, EBS is Excess Burst Size, CF is Coupling Flag, and CM is Color Mode. For this discussion only <CIR, EIR> are mentioned as they are the only parameters whose values would change. The expectation is that the assigned CoS and the per-CoS performance objectives (CPOs)<FLR, FD, MFD, FDR, IFDV, A, L, B> would not be changed. The bandwidth profile information for packet connections is described in detail in the MEF technical specification 10.2 which has been previously incorporated by reference herein.

In FIG. 10, the dynamic bandwidth resizing method 500 has resized the packet connection 940 to the desired bandwidth profile for the change to the packet connection 930. Again, the bridging function 910 effectively sends all ingress client traffic to the packet connection 940 since the bandwidth profile of the packet connection 930 is <0, 0> subsequent to the change in the packet connection 940. The selector function 920 now selects from the packet connection 940. When an application requires "dynamic traffic performance adjustment" of the packet connection 930 (i.e., dynamic adjustment of packet connection bandwidth requirements), then controlled actions occur: Change BW_Profile_2 of the packet connection 940 to desired <CIR, EIR>→Time=t1, Change selector at sink point to the packet connection 940→Time=t2, and Change BW_Profile_1 of the packet connection 930 to 0 (i.e., <CIR, EIR>=<0,0>)→Time=t3. Thus, using the dynamic bandwidth resizing method 500, Client traffic loss is effectively minimized to t2 and Network utilization overshoot is effectively t3. In general, time t2 is minimal, for current state of the art implementations.

Figure 11:
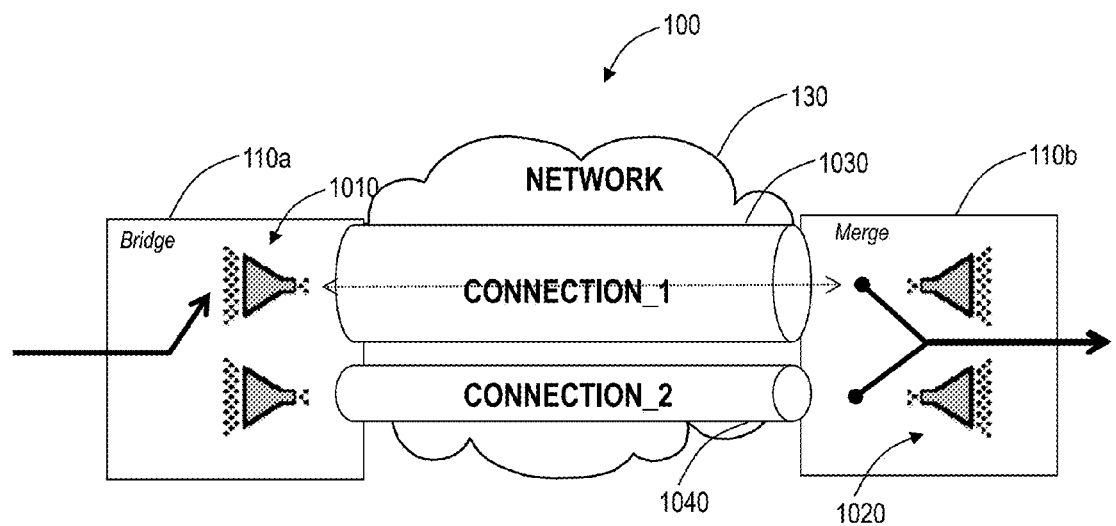
FIGS. 11 and 12 are network diagrams of the network of FIG. 1 implementing the dynamic packet traffic performance adjustment method of FIG. 6.
Figure 12:
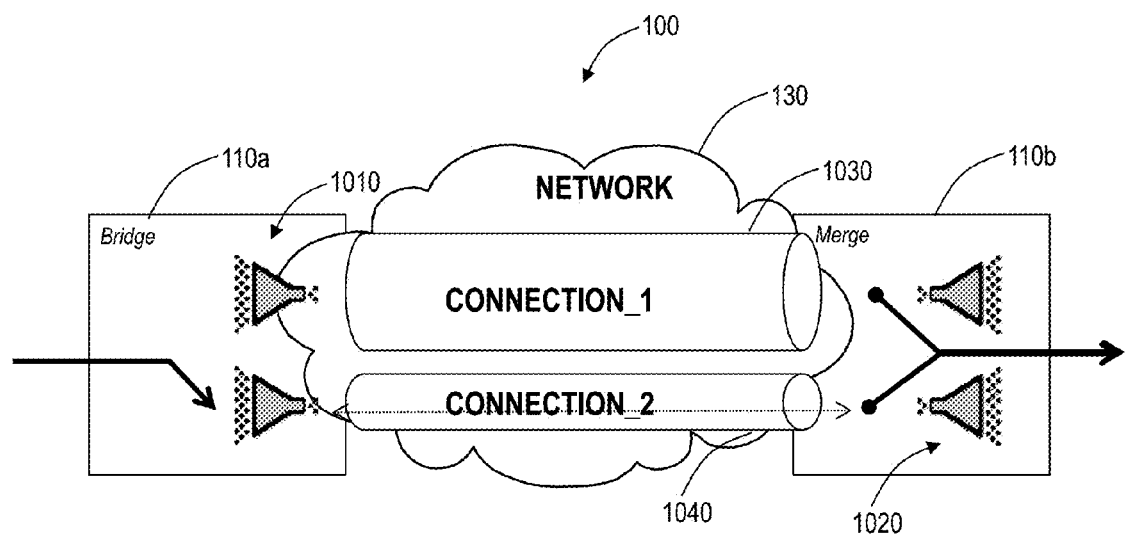

Referring to FIGS. 11 and 12, in an exemplary embodiment, network diagrams illustrate the network 100 implementing the dynamic bandwidth resizing method 600. In FIG. 11, the two packet connections 1030, 1040 are configured between the network elements 110*a*, 110*b*. At this stage, the packet connection 1030 is operating at the first bandwidth profile with <CIR1, EIR1 > and packet connection 1040 is operating at a second bandwidth profile with <CIR2, EIR2 >. A bridging function 1010 sends all ingress client traffic to the packet connection 1030. A merge function 1020 at the network element 110*b* selects from both the packet connections 1030 and 1040. Thus, at steady state, network bandwidth resource utilization is only consumed by the packet connection 1030, since the packet connection 1040 is operating at a second bandwidth profile with <CIR2, EIR2>=<0, 0>.

Note, as described herein, the bandwidth profiles are described for illustration purposes as <CIR, EIR>. However, a bandwidth profile, for a packet connection, can include <CIR, CBS, EIR, EBS, CF, CM> where CIR is Committed Information Rate, CBS is Committed Burst Size, EIR is Excess Information Rate, EBS is Excess Burst Size, CF is Coupling Flag, and CM is Color Mode. For this discussion only <CIR, EIR> are mentioned as they are the only parameters whose values would change. The expectation is that the assigned CoS and the per-CoS performance objectives (CPOs)<FLR, FD, MFD, FDR, IFDV, A, L, B> would not be changed. The bandwidth profile information for packet connections is described in detail in the MEF technical specification 10.2 which has been previously incorporated by reference herein.

In FIG. 12, the dynamic traffic performance adjustment method 600 has resized the active packet connection 1030 to the desired packet connection 1040 performance. Again, the bridging function 1010 sends all ingress client traffic to the packet connection 1030. The merger function 1020 will select/accept from both packet connections 1030 and 1040. When an application requires "dynamic traffic performance adjustment" of the packet connection 1030 (i.e., dynamic adjustment of packet connection bandwidth requirements), then controlled actions occur: Network element 100*a* will have its bridge function changed to the packet connection 1040. Thus, using the dynamic bandwidth resizing method 600, Client traffic loss is effectively minimized to t2 and Network utilization overshoot is effectively t3. In general, time t2 is minimal, for current state of the art implementations.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like.

When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A method for traffic performance adjustment in a source network element using a dynamic resizing technique, the method comprising:
    operating a first connection with a first bandwidth profile and a second connection with a second bandwidth profile with a sink network element, wherein the first connection and the second connection are each between the source network element and the sink network element; and
    sourcing traffic to one or both of the first connection and the second connection to the sink network element, based on a desired bandwidth amount, wherein the sink network element sinks the traffic from the first connection and the second connection based on the desired bandwidth amount and associated settings of the first bandwidth profile and the second bandwidth profile that are set based on dynamic resizing required.

2. The method of claim 1, wherein the sourcing comprises:
    sending the traffic to both the first connection and the second connection, with traffic only flowing on one of the first connection and the second connection based on the first bandwidth profile and the second bandwidth profile,
    wherein the sink network element is configured to select from one of the first connection and the second connection accordingly.

3. The method of claim 1, wherein the sourcing comprises:
    bridging the traffic to one of the first connection and the second connection,
    wherein the sink network element is configured to merge the traffic from both the first connection and the second connection.

4. The method of claim 1, wherein, in the dynamic resizing technique, one of the first bandwidth profile and the second bandwidth profile has a value set to the desired bandwidth amount and another of the first bandwidth profile and the second bandwidth profile has a value set to zero.

5. The method of claim 1, wherein the first connection and the second connection are any of Multiprotocol Label Switching (MPLS)-based, MPLS-Transport Profile (MPLS-TP)-based, Virtual Private Local Area Network Service (VPLS)-based, and Internet Protocol (IP)-based.

6. The method of claim 1, wherein the first connection and the second connection are Ethernet Virtual Connections (EVCs).

7. The method of claim 1, wherein the first bandwidth profile and the second bandwidth profile include <CIR, CBS, EIR, EBS, CF, CM> where CIR is Committed Information Rate, CBS is Committed Burst Size, EIR is Excess Information Rate, EBS is Excess Burst Size, CF is Coupling Flag, and CM is Color Mode.

8. A method for traffic performance adjustment in a sink network element using a dynamic resizing technique, the method comprising:
    operating a first connection with a first bandwidth profile and a second connection with a second bandwidth profile with a source network element, wherein the first connection and the second connection are each between the source network element and the sink network element; and
    sinking traffic from one or both of the first connection and the second connection from the source network element, based on a desired bandwidth amount, wherein the source network element sources the traffic to one or both of the first connection and the second connection based on the desired bandwidth amount and associated settings of the first bandwidth profile and the second bandwidth profile that are set based on dynamic resizing required.

9. The method of claim 8, wherein the sinking is from one of the first connection and the second connection based on the first bandwidth profile and the second bandwidth profile,
    wherein the source network element is configured to source traffic on one of the first connection and the second connection based on the first bandwidth profile and the second bandwidth profile.

10. The method of claim 8, wherein the sinking comprises:
    merging the traffic from both the first connection and the second connection,
    wherein the source network element is configured to bridge the traffic to one of the first connection and the second connection.

11. The method of claim 8, wherein, in the dynamic resizing technique, one of the first bandwidth profile and the second bandwidth profile has a value set to the desired bandwidth amount and another of the first bandwidth profile and the second bandwidth profile has a value set to zero.

12. The method of claim 8, wherein the first connection and the second connection are any of Multiprotocol Label Switching (MPLS)-based, MPLS-Transport Profile (MPLS-TP)-based, Virtual Private Local Area Network Service (VPLS)-based, and Internet Protocol (IP)-based.

13. The method of claim 8, wherein the first connection and the second connection are Ethernet Virtual Connections (EVCs).

14. The method of claim 8, wherein the first bandwidth profile and the second bandwidth profile include <CIR, CBS, EIR, EBS, CF, CM> where CIR is Committed Information Rate, CBS is Committed Burst Size, EIR is Excess Information Rate, EBS is Excess Burst Size, CF is Coupling Flag, and CM is Color Mode.

15. A network element configured to perform dynamic traffic performance adjustment using a dynamic resizing technique, the network element comprising:
    at least one port with a switching fabric communicatively coupled thereto;
    wherein the network element is configured to
    operate a first connection with a first bandwidth profile and a second connection with a second bandwidth profile with another network element, via the at least one port, wherein the first connection and the second connection are each between the source network element and the sink network element,
    if the network element is a source network element, source traffic to one or both of the first connection and the second connection to the another network element, based on a desired bandwidth amount, wherein the another network element sinks the traffic from the first connection and the second connection based on the desired bandwidth amount and associated settings of the first bandwidth profile and the second bandwidth profile that are set based on dynamic resizing required, and if the network element is a sink network element, sink traffic from one or both of the first connection and the second connection from the another network element, based on the desired bandwidth amount, wherein the another network element sources the traffic to one or both of the first connection and the second connection based on the desired bandwidth amount and associated settings of the first bandwidth profile and the second bandwidth profile that are set based on the dynamic resizing required.

16. The method of claim 8, wherein, in the dynamic resizing technique, one of the first bandwidth profile and the second bandwidth profile has a value set to the desired bandwidth amount and another of the first bandwidth profile and the second bandwidth profile has a value set to zero.

17. The network element of claim 15, wherein the first connection and the second connection are any of Multiprotocol Label Switching (MPLS)-based, MPLS-Transport Profile (MPLS-TP)-based, Virtual Private Local Area Network Service (VPLS)-based, and Internet Protocol (IP)-based.

18. The network element of claim 15, wherein the first connection and the second connection are Ethernet Virtual Connections (EVCs).

19. The network element of claim 15, wherein the first bandwidth profile and the second bandwidth profile include <CIR, CBS, EIR, EBS, CF, CM> where CIR is Committed Information Rate, CBS is Committed Burst Size, EIR is Excess Information Rate, EBS is Excess Burst Size, CF is Coupling Flag, and CM is Color Mode.

* * * * *